(12) United States Patent
Yoneyama

(10) Patent No.: US 6,870,580 B2
(45) Date of Patent: Mar. 22, 2005

(54) ILLUMINATION OPTICAL SYSTEM HAVING A MIRROR WITH A CURVED SURFACE HAVING ROTATIONAL SYMMETRY ABOUT A PREDETERMINED AXIS

(75) Inventor: Kazuya Yoneyama, Omiya (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 597 days.

(21) Appl. No.: 09/737,752

(22) Filed: Dec. 18, 2000

(65) Prior Publication Data

US 2003/0035221 A1 Feb. 20, 2003

(30) Foreign Application Priority Data

Dec. 16, 1999 (JP) .......................................... 11-357454

(51) Int. Cl.[7] .......................... H04N 5/74; G03B 21/26; G03B 21/288
(52) U.S. Cl. ....................... 348/756; 348/757; 348/781; 348/782; 353/37; 353/98; 359/629
(58) Field of Search ............................... 348/756–757, 348/781–782; 353/37, 98, 102; 359/629, 631, 634; H04N 5/74; G03B 21/26, 21/288

(56) References Cited

U.S. PATENT DOCUMENTS

| | | | | |
|---|---|---|---|---|
| 4,247,769 A | * | 1/1981 | Warner ................... | 250/231.14 |
| 5,435,724 A | * | 7/1995 | Goodman et al. .......... | 433/215 |
| RE38,225 E | * | 8/2003 | Itoh et al. ................. | 359/618 |
| 2001/0043312 A1 | * | 11/2001 | Fuse et al. ................. | 353/57 |
| 2003/0010990 A1 | * | 1/2003 | Misawa et al. ............. | 257/88 |

* cited by examiner

*Primary Examiner*—Brian P. Yenke
(74) *Attorney, Agent, or Firm*—Snider & Associates; Ronald R. Snider

(57) ABSTRACT

A projection type image display apparatus comprises a light source unit; an integrator unit for mixing luminous fluxes emitted from the light source unit so as to homogenize their light quantity distribution; a curved mirror for bending the optical path of luminous fluxes, which are turned into uniform light by the integrator unit, toward a projection unit; and the projection unit for causing the luminous fluxes to carry image information and projecting these luminous fluxes onto a screen.

13 Claims, 8 Drawing Sheets

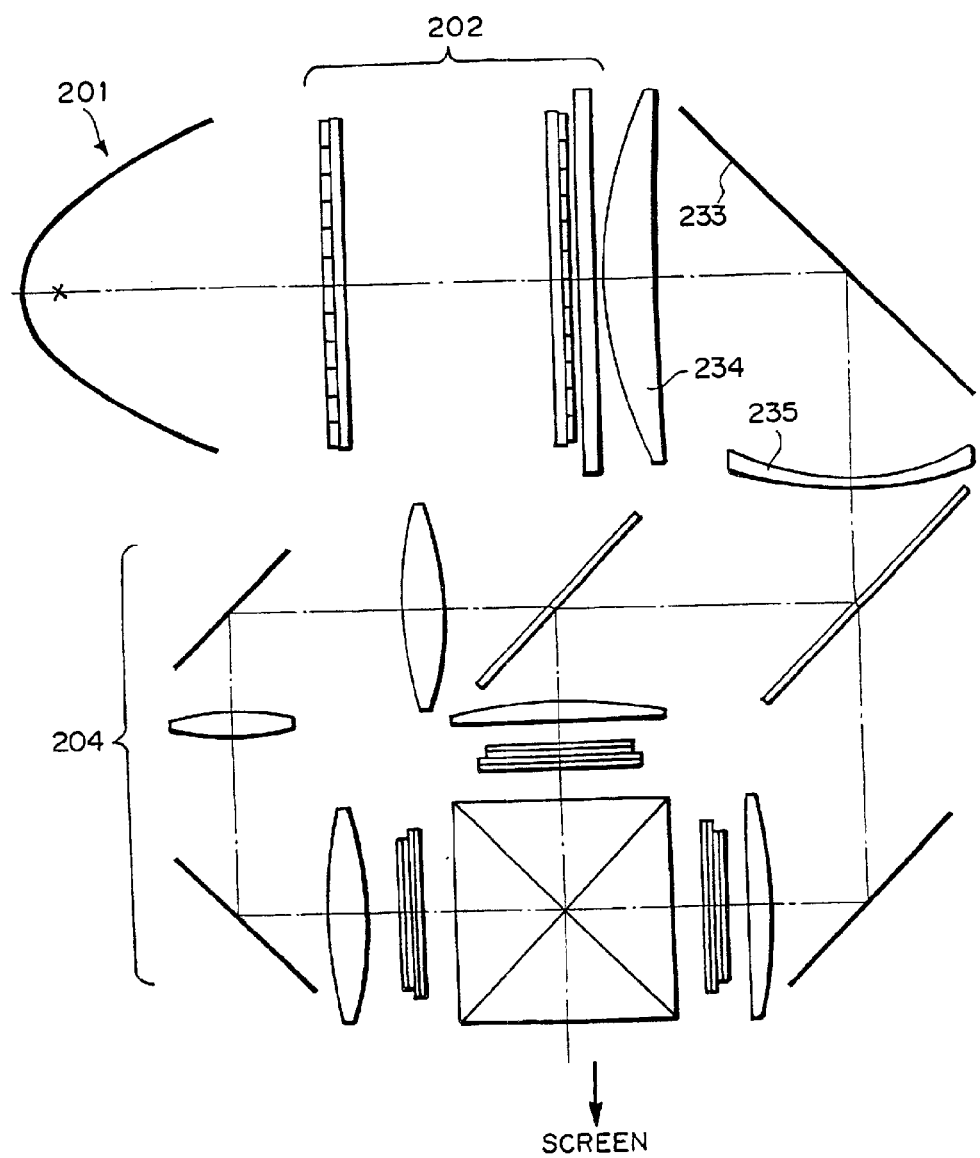

ILLUMINATION OPTICAL SYSTEM HAVING A MIRROR WITH A CURVED SURFACE HAVING ROTATIONAL SYMMETRY ABOUT A PREDETERMINED AXIS

RELATED APPLICATIONS

This application claims the priority of Japanese Patent Application No. 11-357454 filed on Dec. 16, 1999, which is incorporated herein by reference.

BACKGROUND OF THE INVENTION

1. Field of the Invention

The present invention relates to an illumination optical system of a projection type image display apparatus; and, in particular, to a simplification of the structure of an illumination optical system suitable for a projection type image display apparatus which projects an image under magnification by using a transmission or reflection type liquid crystal display device, a digital micro mirror device DMD), and the like.

2. Description of the Prior Art

As projection type image display apparatus, those using a transmission or reflection type liquid crystal display device have been known well, for example. Also, utilization of digital micro mirror device (DMD) has recently been in progress.

FIGS. 7 and 8 are views showing configurations of conventional projection type image display apparatus using liquid crystal display devices. Each of these conventional projection type image display apparatus schematically comprises a light source unit 101, 201; an integrator unit 102, 202 for mixing luminous fluxes emitted from the light source unit 101, 201 so as to homogenize their light quantity distribution; a condenser lens 134, 234, 235 for performing a light-collecting action of this illumination optical system; and a projection unit 104, 204 for causing the luminous fluxes to carry image information and projecting these luminous fluxes onto a screen. Also, each of these apparatus comprises a plane reflection mirror 133, 233 for bending the optical path of the luminous fluxes, which are turned into uniform light by the integrator unit 102, 202, toward the projection unit 104, 204, so that each member is disposed within a limited space inside the apparatus.

Meanwhile, it is safe to state that there is always a demand for cutting down the cost when developing products in practice. The above-mentioned projection type image display apparatus are no exception.

SUMMARY OF THE INVENTION

In view of such circumstances, it is an object of the present invention to provide an illumination optical system which can reduce the number of members and cut down its cost while exhibiting performances on a par with those of conventional apparatus, and a projection type image display apparatus using the same.

The present invention provides an illumination optical system for guiding light from a light source unit to an image display light valve element, wherein at least one curved mirror is disposed in an optical path of the illumination optical system.

Preferably, the curved mirror forms a part of a curved surface having rotational symmetry about a predetermined axis.

Preferably, in the illumination optical system in accordance with the present invention, the curved mirror is a parabolic mirror, and the parabolic mirror has a form, in a cross section including an optical path of the light from the light source unit to the image display light valve element, satisfying the following conditional expression (1) or (2):

$$f=\{-L\pm L[1+(\tan\theta)^2]^{1/2}\}/2\tan\theta \quad (1)$$

$$f=L/2 \quad (2)$$

where $\theta\neq 90+180n$ (n being an integer) degrees in conditional expression (1);

$\theta=90+180n$ (n being an integer) degrees in conditional expression (2);

f is the focal length of the parabolic mirror (where f>0);

L is the distance between the optical axis of luminous flux before reflection and z axis of the parabolic mirror; and $\theta$ is the optical axis bending angle caused by reflection of the parabolic mirror.

Preferably, in the illumination optical system in accordance with the present invention, the curved mirror is a hyperbolic mirror, and the hyperbolic mirror has a form, in a cross section including an optical path of the light from the light source unit to the image display light valve element, satisfying the following conditional expression (3):

$$z=C\rho^2/[1+(1-KC^2\rho^2)^{1/2}] \quad (3)$$

where z is the distance between the reflection point of the optical axis of luminous flux before reflection in the hyperbolic mirror and the tangent plane at the apex of the hyperbolic mirror;

$\rho$ is the distance between the reflection point of the optical axis of luminous flux before reflection and z axis of the hyperbolic mirror;

C is a value defined as $C=a/b^2$ by a (where a>0) and b satisfying the following conditional expressions (3-1) and (3-2); and K is a value defined as $K=-a/b^2$ by a (where a>0) and b satisfying the following conditional expressions (3-1) and (3-2);

$$8za^3+4(z^2+\rho^2)a^2-2zL^2a-z^2L^2=0 \quad (3\text{-}1)$$

$$2(a^2+b^2)^{1/2}=L \quad (3\text{-}2)$$

where

L is the focus-to-focus distance of the hyperbolic mirror defined by the following conditional expression (3-3):

$$L=\{[(Q-M)\sin\theta]^2+[(P-M)-(Q-M)\cos\theta]^2\}^{1/2} \quad (3\text{-}3)$$

where

P is the focal length of the optical system upstream the hyperbolic mirror;

Q is the composite focal length of the optical system upstream the hyperbolic mirror and the hyperbolic mirror;

M is the distance from the optical system upstream the hyperbolic mirror to the hyperbolic mirror; and $\theta$ is the optical axis bending angle caused by reflection of the hyperbolic mirror.

Preferably, the curved mirror is a spherical mirror.

The present invention provides a projection type image display apparatus comprising the above-mentioned illumination optical system.

The above-mentioned "z axis of the parabolic mirror" and "z axis of the hyperbolic mirror" indicate the axis passing the apex of the parabolic mirror or hyperbolic mirror and being orthogonal to the plane tangent to the apex.

BRIEF DESCRIPTION OF THE DRAWINGS

FIG. 8 is a view showing the configuration of a conventional projection type image display apparatus corresponding to the second embodiment.

DESCRIPTION OF THE PREFERRED EMBODIMENTS

In the following, two embodiments of the present invention will be explained with reference to the drawings.

Figure 1:
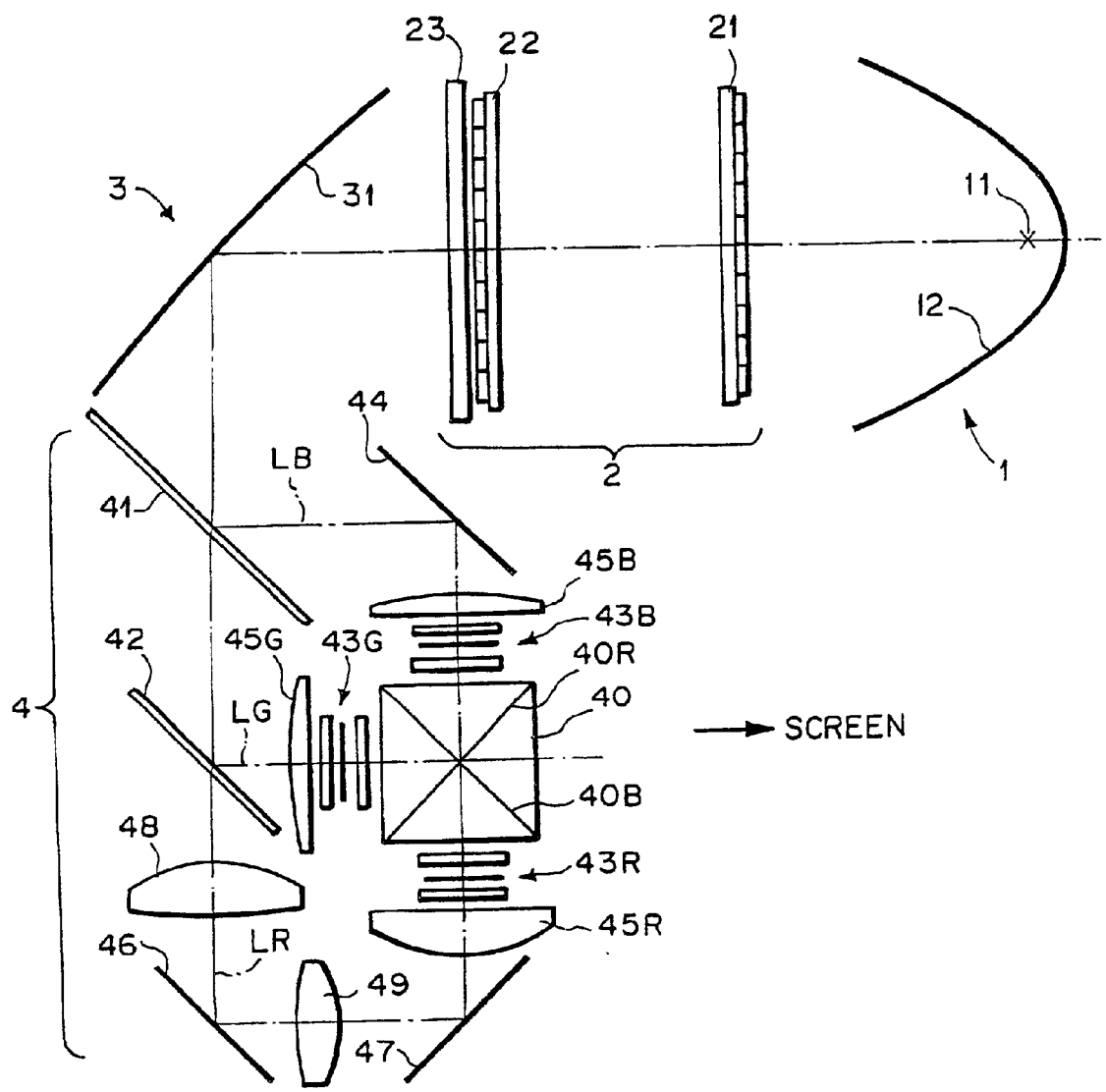
FIG. 1 is a view showing the configuration of a projection type image display apparatus comprising the illumination optical system in accordance with a first embodiment.

FIG. 1 is a view showing the configuration of a projection type image display apparatus comprising the illumination optical system in accordance with a first embodiment.

As shown in FIG. 1, this projection type image display apparatus comprises a light source unit 1; an integrator unit 2 for mixing luminous fluxes emitted from the light source unit 1 so as to homogenize their light quantity distribution; a curved mirror 3 for bending the optical path of luminous fluxes, which are turned into uniform light by the integrator unit 2, toward a projection unit 4; and the projection unit 4 for causing the luminous fluxes to carry image information and projecting these luminous fluxes onto a screen.

As shown in FIG. 1, the light source unit 1 comprises a light-emitting element 11, constituted by a discharge tube such as xenon lamp or metal halide lamp, for emitting randomly polarized light; and a reflector 12 constituted by a parabolic mirror. The reflector 12 has a focal position located at the light-emitting source of the light-emitting element 11, and reflects a part of luminous fluxes which are emitted from the light-emitting element 11 toward the rear side and outside of the optical axis of the light source unit 1, so as to make them a luminous flux substantially parallel to the optical axis.

The integrator unit 2 comprises a second fly's eye 21 acting on the luminous flux from the light source unit 1; a first fly's eye 22 for superimposing light spots caused by individual luminous fluxes from the second fly's eye 21 onto a liquid crystal panel which will be mentioned later; and a polarization beam splitter (PBS) 23 as polarization converting means which unifies polarizing directions of individual luminous fluxes from the first fly's eye 22 into a predetermined direction.

The second fly's eye 21 is constituted by a plurality of lens array devices arranged two-dimensionally, each having a form substantially corresponding to a liquid crystal panel which will be mentioned later. Similarly, the first fly's eye 22 is constituted by a plurality of lens array devices arranged two-dimensionally. Namely, an image of the light source unit 1 is formed for each lens array device of the first fly's eye 22.

The polarization beam splitter 23 is polarization converting means provided for preventing the light quantity from decreasing, and is disposed on the projection unit 4 side of the first fly's eye 22. It divides the luminous flux homogenized by the second fly's eye 21 and first fly's eye 22 into P- and S-polarized light components, then sets both of these polarized light components to the polarization of one of them, and outputs them as parallel rays.

The curved mirror 3 is constituted by a parabolic mirror 31 whose form in a cross section including the optical axis of luminous fluxes bent by the curved mirror 3 becomes a part of a parabola.

The projection unit 4 comprises a B/GR separating dichroic mirror 41 for separating the luminous flux homogenized by the integrator unit 2 into a B component LB and GR components LG and LR; a G/R separating dichroic mirror 42 for separating the GR components LG, LR obtained by the dichroic mirror 41 into the G component LG and the R component LR; a liquid crystal panel 43B (held by a pair of sheet polarizers, ditto for liquid crystal panels 43G, 43R) for displaying an image for the B component; a liquid crystal panel 43G for displaying an image for the G component; a liquid crystal panel 43R for displaying an image for the R component; and a three-color combining prism 40 for combining the components LB, LG, LR of luminous fluxes transmitted through the respective liquid crystal panels 43B, 43G, 43R carrying image information. Also, the projection unit 4 comprises a total reflection mirror 44 for reflecting the B component LB separated by the B/GR separating dichroic mirror 41 toward the liquid crystal panel 43B; a field lens 45B for causing the B component LB reflected by the total reflection mirror 44 to become parallel rays; a field lens 45G for causing the G component LG separated by the G/R separating dichroic mirror 42 to become parallel rays; total reflection mirrors 46, 47 for reflecting the R component LR separated by the G/R separating dichroic mirror 42 toward the liquid crystal panel 43R; and a field lens 45R for causing the R component LR separated by the G/R separating dichroic mirror 42 to become parallel rays.

While only the R component LR has a different optical path length to the three-color combining prism 40, a relay lens 48 is disposed between the G/R separating dichroic mirror 42 and the total reflection mirror 46, and an image-inverting relay lens 49 is disposed between the total reflection mirrors 46 and 47, so that the relay lens 48 and image-inverting relay lens 49 correct the image-forming relationship of the R component LR so as to make it apparently equal to those of B component LB and G component LG.

The three-color combining prism 40 is a cross prism having a dichroic surface 40B for reflecting the B component LB and a dichroic surface 40R for reflecting the R component LR.

The luminous flux thus combined by the three-color combining prism 40 is converged by a projection lens (not depicted) and, according to the image information carried thereby, forms an image onto a screen (not depicted).

Figure 2:
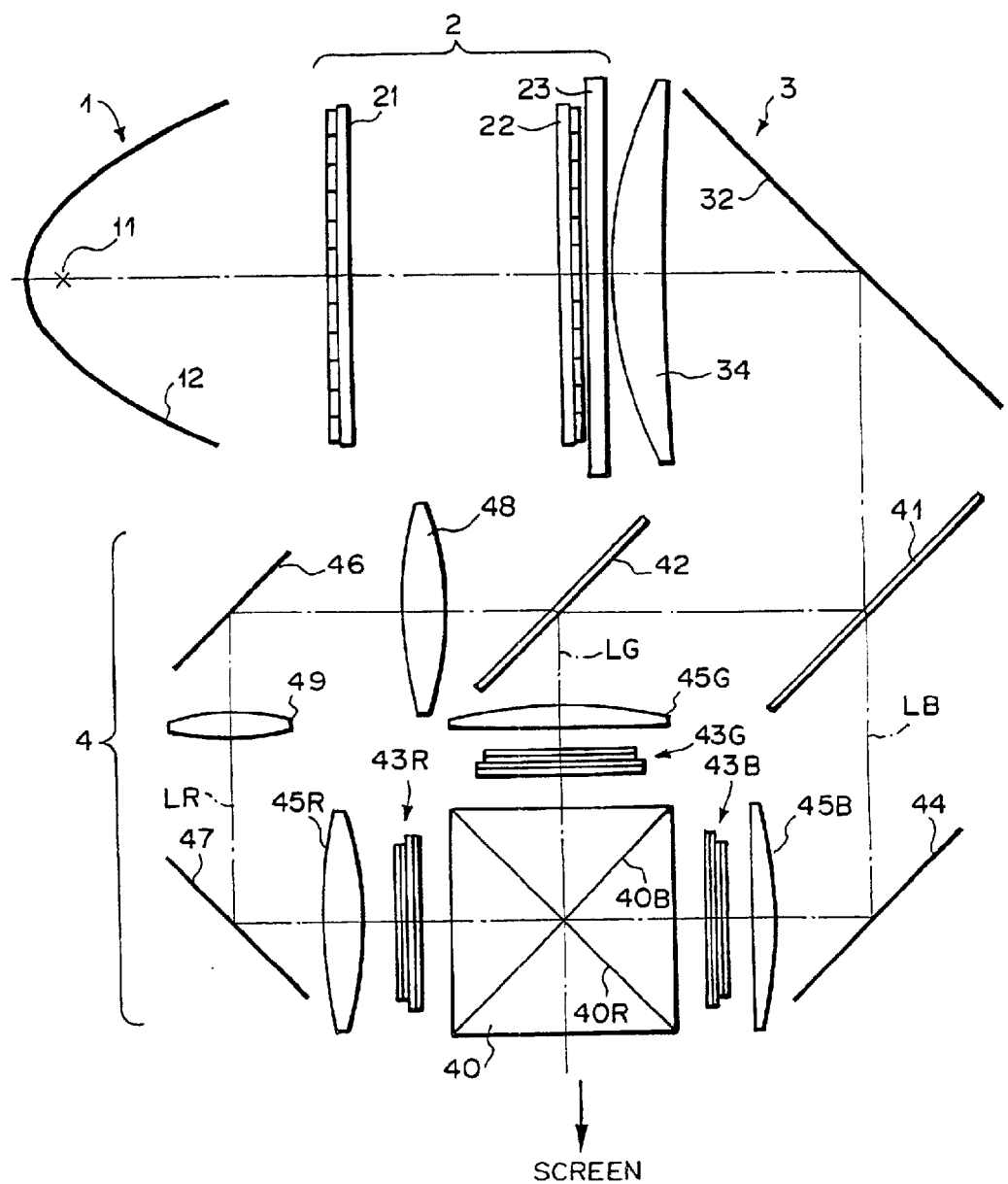
FIG. 2 is a view showing the configuration of a projection type image display apparatus comprising the illumination optical system in accordance with a second embodiment.

FIG. 2 is a view showing the configuration of a projection type image display apparatus comprising the illumination optical system in accordance with a second embodiment. Members similar to those in the first embodiment of the present invention will be referred to with numerals identical thereto.

This apparatus has a configuration nearly similar to that of the above-mentioned apparatus comprising the illumination optical system in accordance with the first embodiment, in which a luminous flux emitted from a light source unit 1 and then turned into uniform light by an integrator unit 2 is caused to carry image information and projected onto a screen by a projection unit 4. The second embodiment differs from the first embodiment in that a hyperbolic mirror 32 is disposed in place of the parabolic mirror 31 of the first embodiment, and that a condenser lens 34 is disposed between the integrator unit 2 and the hyperbolic mirror 32.

Figure 7:
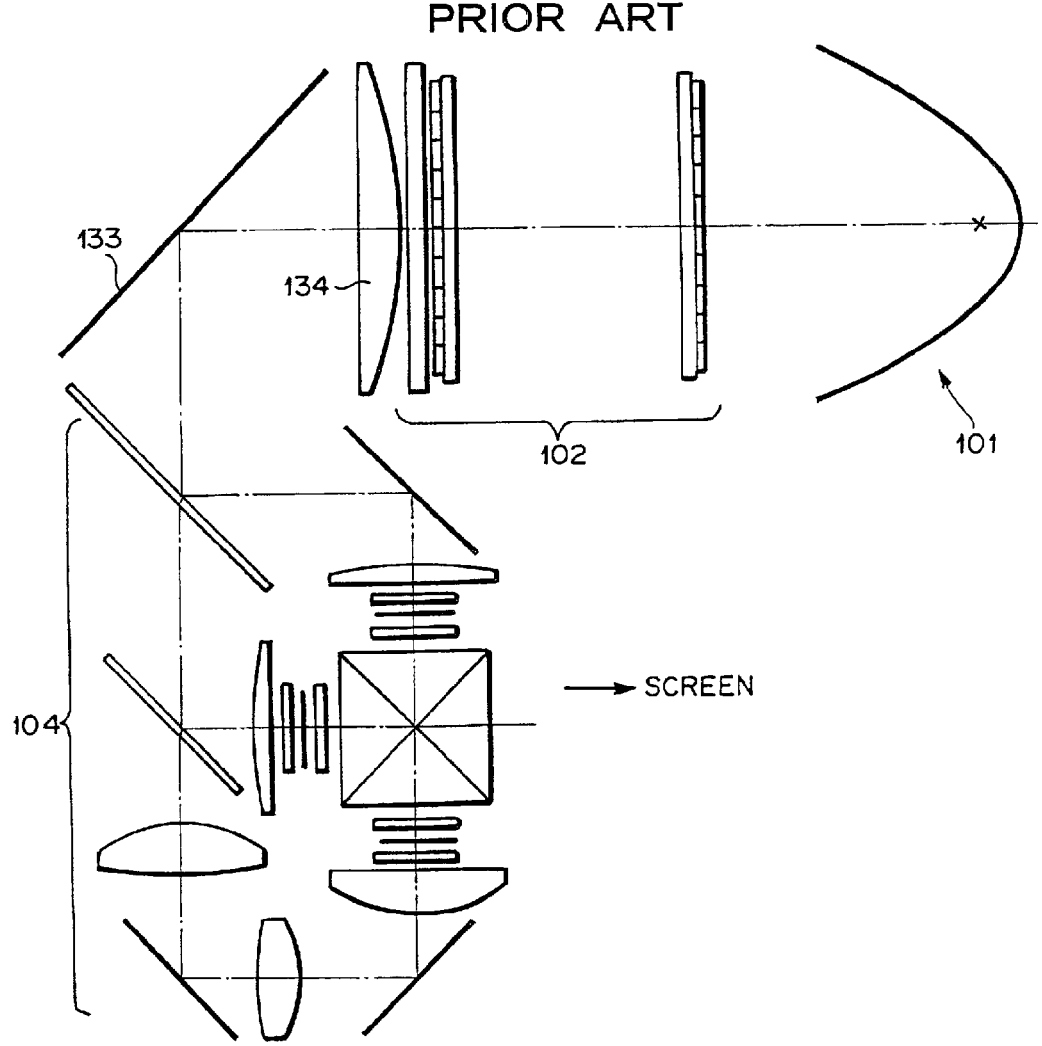
FIG. 7 is a view showing the configuration of a conventional projection type image display apparatus corresponding to the first embodiment.

Operations and effects of the first and second embodiments will now be explained in comparison with conventional illumination optical systems. FIG. 7 shows an example of conventional illumination optical system corresponding to the first embodiment, whereas FIG. 8 shows an example of conventional illumination optical system corresponding to the second embodiment.

These apparatus are configured nearly the same as the above-mentioned apparatus comprising the illumination optical system in accordance with the first embodiment, in which a luminous flux emitted from a light source unit 101, 201 and then turned into uniform light by an integrator unit 102, 202 is caused to carry image information and projected onto a screen by a projection unit 104, 204. The individual members constituting the light source units 101, 201, integrator units 102, 202, and projection units 104, 204 are similar to those in the first embodiment, and their numerals are omitted.

In the conventional illumination optical system shown in FIG. 7, a plane reflection mirror 133 for bending the optical path of the luminous flux turned into uniform light by the integrator unit 102 toward the projection unit 104 and a condenser lens 134 having a positive refracting power for performing a light-collecting action of this illumination optical system are disposed.

In the illumination optical system in accordance with the first embodiment shown in FIG. 1, by contrast, the parabolic mirror 31 is disposed in place of the conventional plane reflection mirror 133, whereby the condenser lens 134 having a positive refracting power is made unnecessary. Namely, since the plane reflection mirror 133 is replaced by the parabolic mirror 31, the action of plane reflection mirror 133 for bending the optical path such that individual members can be arranged within a limited space of the apparatus and the light-collecting action of the condenser lens 131 having a positive refracting power can be attained at the same time.

In the conventional illumination optical system shown in FIG. 8, a plane reflection mirror 233 for bending the optical path of the luminous flux turned into uniform light by the integrator unit 202 toward the projection unit 204 and, as a condenser lens group having a positive refracting power for performing a light-collecting action of this illumination optical system, a condenser lens 234 having a positive refracting power and a condenser lens 235 having a negative refracting power are disposed.

In the illumination optical system in accordance with the second embodiment shown in FIG. 2, by contrast, the hyperbolic mirror 32 is disposed in place of the conventional plane reflection mirror 233, whereby the condenser lens 235 having a negative refracting power is made unnecessary. Namely, since the plane reflection mirror 233 is replaced by the hyperbolic mirror 32, the action of plane reflection mirror 233 for bending the optical path such that individual members can be arranged within a limited space of the apparatus and the light-collecting action of the condenser lens 235 having a negative refracting power can be attained at the same time.

Thus, one parabolic mirror 31 or hyperbolic mirror 32 (hereinafter collectively referred to as curved mirror) performs both actions of two members, i.e., the plane reflection mirror 133 and the condenser lens 134 having a positive refracting power, or the plane reflection mirror 233 and the condenser lens 235 having a negative refracting power, whereby the number of members can be reduced, so as to cut down the cost. Also, since the lens holding space of condenser lenses 134, 235 can be reduced, the optical system can be made compact.

When the refracting power of a curved surface is utilized, there is a fear of aberration characteristics becoming inferior to those of lenses. However, in general, tolerances for unevenness in light and/or aberration are greater in illumination optical systems used in projection type image display apparatus than in cameras, for example. Therefore, such adverse effects are hard to appear even when the light-collecting or diverging action of curved mirror is utilized as in these embodiments.

Optimal forms of curved mirror are not limited to the parabolic mirror and hyperbolic mirror shown in the above-mentioned first and second embodiments. The form of curved mirror may vary depending on its positional relationship with respect to other members in the optical system, and according to at which position it is disposed in the optical path. Hence, it may be the form of a part of a curved surface having rotational symmetry about a predetermined axis as in these embodiments, a spherical mirror, or any of other curved mirrors. However, aberration will be better if a part of a curved surface having rotational symmetry is utilized. On the other hand, spherical mirrors are superior in terms of easiness in manufacture.

The position at which the curved mirror is disposed is not limited to that shown in these embodiments. For example, a curved mirror may be disposed in place of the total reflection mirrors 44, 46, 47 in FIG. 1. A plurality of curved mirrors having the same form or different forms may also be disposed in the illumination optical system.

The illumination optical system comprising a curved mirror is effective not only in projection type display apparatus using a liquid crystal display device as in these embodiments, but also in apparatus using DMD. Curved mirrors may be disposed in place of total reflection mirrors provided for bending optical paths in such apparatus as well.

EXAMPLE 1

A specific example of the parabolic mirror 31 explained as the above-mentioned first embodiment will be shown as Example 1.

Figure 3:
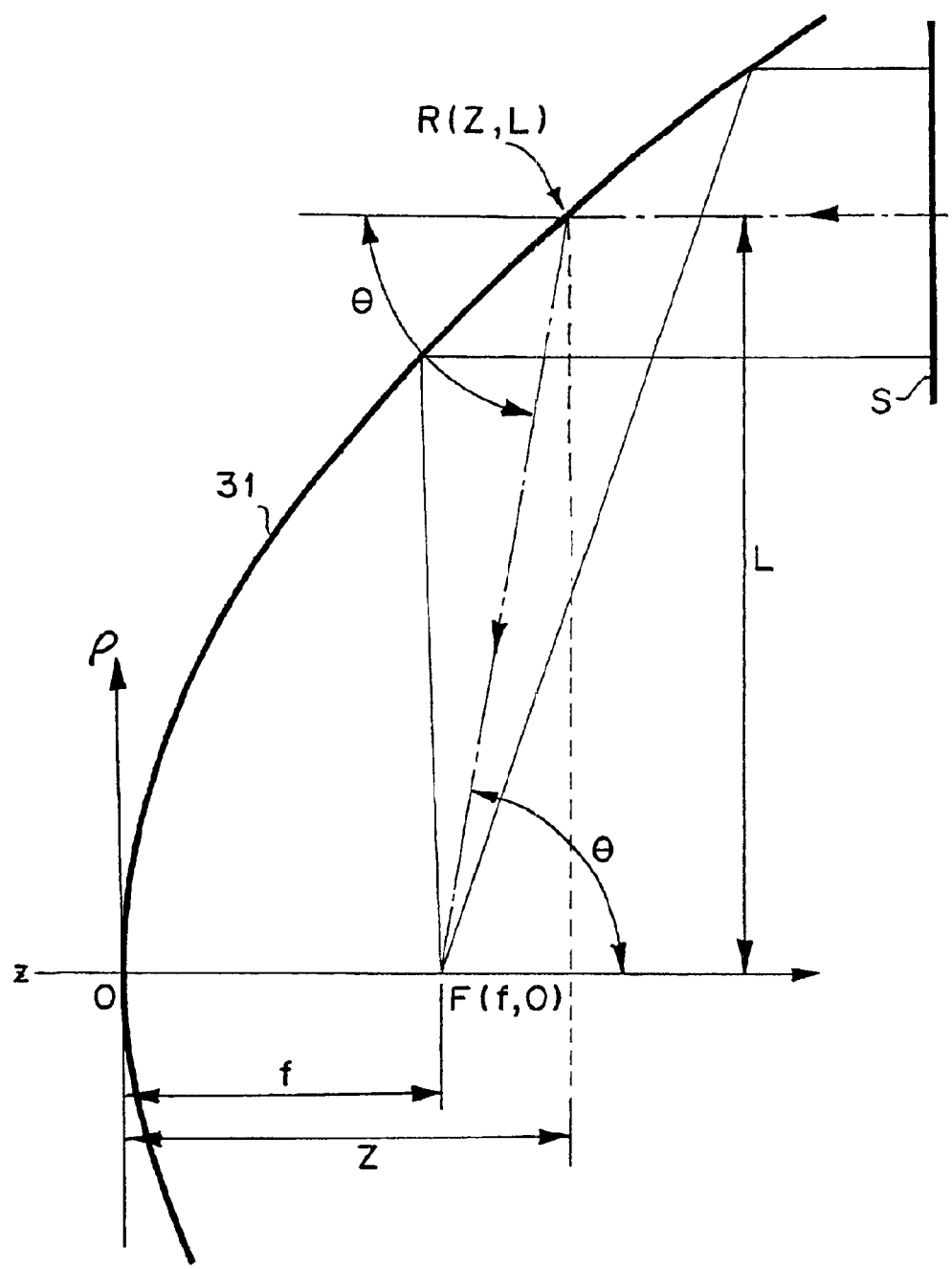
FIG. 3 is a view for explaining the form of parabolic mirror in Example 1.

FIG. 3 is a view schematically showing the form of parabolic mirror 31 in a cross section including the optical axis of a luminous flux bent by this parabolic mirror 31. In this cross section, the parabolic mirror 31 forms a part of a parabola.

In FIG. 3, a luminous flux emitted from a principal plane S of the upstream optical system is guided to a focal point F under the action of parabolic mirror 31. The focal point F is a position which will be the center of a light valve if no field lens exists immediately upstream the light valve. The optical axis is bent by 80 degrees ($\theta=80$ degrees) due to the parabolic mirror 31.

Concerning the parabolic mirror 31, the apex of parabola in the sectional view of FIG. 3 is taken as the origin O, $\rho$ axis is taken so as to become tangent to the apex of parabola, and z axis is taken orthogonal to the ρ axis so as to pass the apex of parabola. The focal point F of parabola is located on the z axis, and its coordinates are (f, 0), where f is the focal length. Also, the optical axis of the luminous flux before reflection emitted from the principal plane S and the z axis of parabolic mirror 31 are made parallel to each other.

The form of parabolic mirror 31 can be defined by the optical axis bending angle θ caused by the reflection of parabolic mirror 31 and the distance L between the optical axis of luminous flux before reflection and the z axis of parabolic mirror 31. As Example 1, a method of determining the form of parabolic mirror 31 in the case where θ=80 degrees and L=80 will be shown.

In FIG. 3, as a general expression of a parabola having an origin O at its apex and z axis as its axis of symmetry, the equation of a parabola which forms a predetermined cross section of the parabolic mirror 31 is represented by:

$$z=\rho^2/4f \qquad (1\text{-}0)$$

where Q(z, ρ) is a given point on the parabola. Namely, this parabolic form will uniquely be determined if the focal length f of parabola is set. As will be explained in the following, the focal length f can be defined by the optical axis bending angle θ and the distance L between the optical axis of luminous flux before reflection and the z axis of parabolic mirror 31.

Here, the intersection between the optical axis of a luminous flux incident on the parabolic mirror 31 and the parabolic mirror 31 is taken as a reflection point R(Z, L). L is the distance between the reflection point R and the z axis, whereas Z is expressed as:

$$Z=f+L/\tan\theta \qquad (1\text{-}1)$$

by using the optical axis bending angle θ. Since the reflection point R is located on the parabola, expression (1-1) is inputted into expression (1-0), so as to yield:

$$f+L/\tan\theta=L^2/4f \qquad (1\text{-}2)$$

Expression (1-2) is modified as expression (1-3), whereby conditional expression (1) is obtained as the solution of the quadratic equation:

$$4(\tan\theta)f^2+4Lf-L^2(\tan\theta)=0 \qquad (1\text{-}3)$$

$$f=\{-L\pm L[1+(\tan\theta)^2]^{1/2}\}/2\tan\theta \qquad (1)$$

Here, a positive value is employed as the solution of focal length f. This is because of the fact that the parabolic surface cannot have a converging action unless the focal length f is positive.

Thus, according to conditional expression (1), the parabolic mirror 31 has a form of a parabolic surface with a focal length f=33.56 in the case where the optical axis bending angle θ is 80 degrees and the distance L=80 between the optical axis of luminous flux before reflection and the z axis of parabolic mirror 31.

EXAMPLE 2

Similarly, as a specific example of the parabolic mirror 31, Example 2 shows a case where the optical axis bending angle (θ) caused by the parabolic mirror 31 is 90 degrees.

Figure 4:
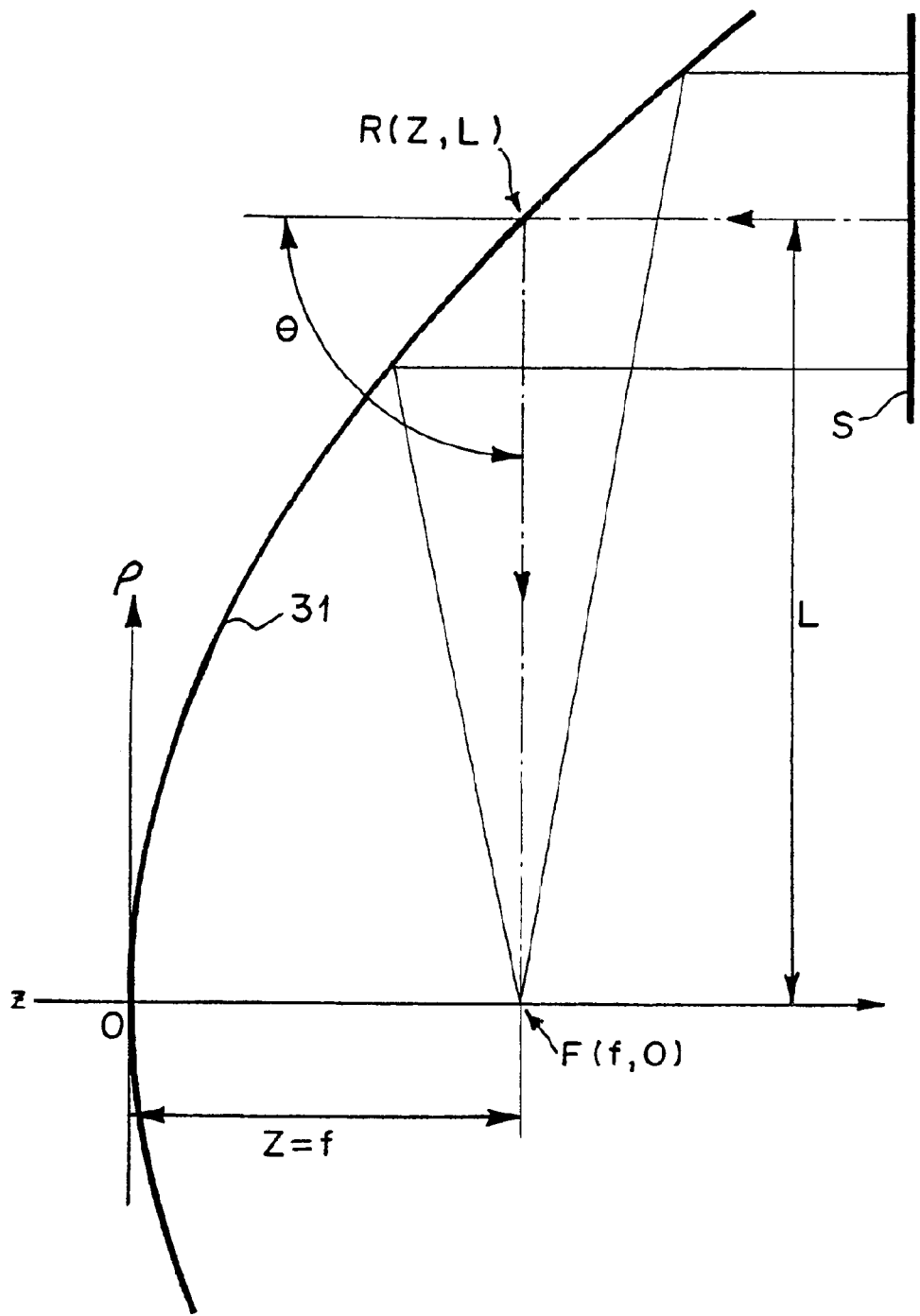
FIG. 4 is a view for explaining the form of parabolic mirror in Example 2.

FIG. 4 is a view schematically showing the form of parabolic mirror 31 in a cross section including the optical axis of a luminous flux bent by this parabolic mirror 31. In this cross section, the parabolic mirror 31 forms a part of a parabola.

A luminous flux emitted from a principal plane S of the upstream optical system is guided to a focal point F under the action of parabolic mirror 31 in FIG. 4 as well. The focal point F is a position which will be the center of a light valve if no field lens exists immediately upstream the light valve.

Concerning the parabolic mirror 31, the origin O, ρ axis, and z axis are taken as in Example 1. The focal point F of parabola is located on z axis, and its coordinates are (f, 0), where f is the focal length. Also, the optical axis of the luminous flux before reflection emitted from the principal plane S and the z axis of parabolic mirror 31 are made parallel to each other.

As in Example 1, the form of parabolic mirror 31 can be defined by the optical axis bending angle θ caused by the reflection of parabolic mirror 31 and the distance L between the optical axis of luminous flux before reflection and the z axis of parabolic mirror 31. Example 2 shows a method of determining the form of parabolic mirror 31 in the case where θ=90 degrees and L=80.

Since θ=90 degrees, tan θ becomes infinity. Hence, the second term L/tan θ=0 in the above-mentioned expression (1-1), whereby expressions (1-1) and (1-2) explained in Example 1 become the following expressions (2-1) and (2-2):

$$Z=f \qquad (2\text{-}1)$$

$$f=L^2/4f \qquad (2\text{-}2)$$

As in Example 1, a positive value is employed as the solution of focal length f. This is because of the fact that the parabolic surface cannot have a converging action unless the focal length f is positive.

Therefore, from expression (2-2), the following conditional expression (2) can be obtained:

$$f=L/2 \qquad (2)$$

Thus, according to expression (2), the parabolic mirror 31 has a form of a parabolic surface with a focal length f=40 in the case where the optical axis bending angle θ is 90 degrees and the distance L=80 between the optical axis of luminous flux before reflection and the z axis of parabolic mirror 31.

EXAMPLE 3

As Example 3, a specific example of the hyperbolic mirror 32 explained as the above-mentioned second embodiment will be shown.

Figure 5:
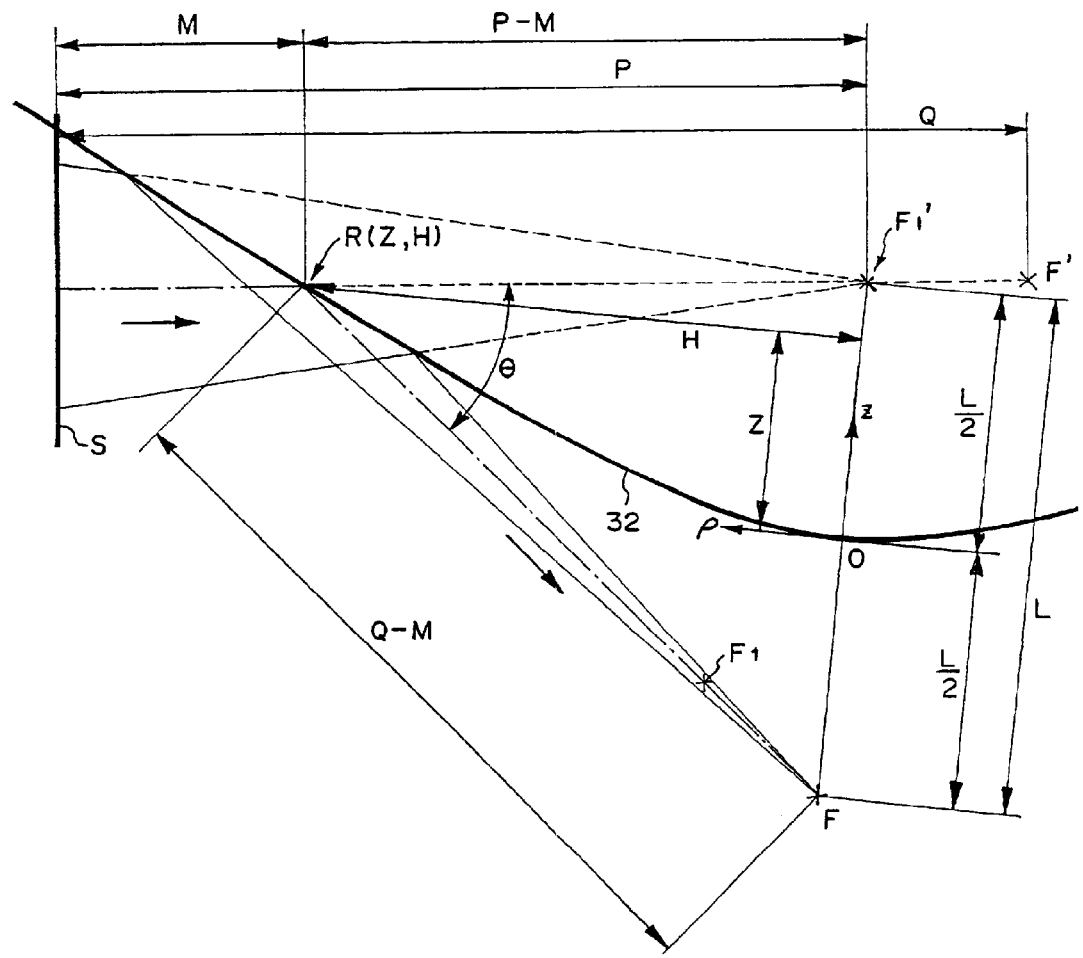
FIG. 5 is a view for explaining the form of hyperbolic mirror in Example 3.

FIG. 5 is a view schematically showing the form of hyperbolic mirror 32 in a cross section including the optical axis of a luminous flux bent by this hyperbolic mirror 32. In this cross section, the hyperbolic mirror 32 forms a part of a parabola.

In FIG. 5, a luminous flux emitted from a principal plane S of the upstream optical system is guided to a focal point F under the action of hyperbolic mirror 32. As explained as the above-mentioned second embodiment, the condenser lens 34 having a positive refracting power is disposed upstream the hyperbolic mirror 32. The convergent luminous flux emitted from the positive condenser lens 34 is reflected by the hyperbolic mirror 32, so as to be directed to the focal point F while lowering its degree of convergence. Though the reflected light beam would be converged at a focal point $F_1$ shown in FIG. 5 if a plane mirror was disposed instead of the hyperbolic mirror 32, it is collected at the focal point F located farther than the focal point $F_1$ since the hyperbolic mirror 32 is disposed.

The focal point F is a position which will be the center of a light valve if no field lens exists immediately upstream the light valve. The optical axis is bent by 45 degrees ($\theta$=45 degrees) due to the hyperbolic mirror 32.

For convenience of explanation, FIG. 5 also shows a focal point $F_1'$ which will be formed by the condenser lens 34 if the luminous flux from the condenser lens 34 advances straight forward without the aid of the hyperbolic mirror 32, and a target composite focal length position (focal point F') indicating how much the focal point $F_1'$ is elongated by the hyperbolic mirror 32. This focal point F' corresponds to a position to which the focal point of condenser lens 234 is extended by the refracting power of negative condenser lens 235 in the conventional example shown in FIG. 8.

Example 3 shows an example in which the hyperbolic mirror 32 is disposed when the focal length P of the upstream condenser lens 34 having a positive refracting power is 100, so as to yield a composite local length Q of 120 with the condenser lens 34.

Concerning the hyperbolic mirror 32, the apex of hyperbola in the sectional view of FIG. 5 is taken as the origin O, $\rho$ axis is taken so as to become tangent to the apex of hyperbola, and z axis is taken orthogonal to the $\rho$ axis so as to pass the apex of hyperbola. Here, the focal points F and $F_1'$ are located on the z axis.

The form of hyperbolic mirror 32 can be defined by the optical axis bending angle $\theta$ caused by the reflection of hyperbolic mirror 32, and the focus-to-focus distance L of hyperbolic mirror 32 calculated from the focal length P of condenser lens 34, composite focal length Q of condenser lens 34 and hyperbolic mirror 32, and distance M from the condenser lens 34 to the hyperbolic mirror 32. Example 3 shows a method of determining the form of hyperbolic mirror 32 in the case where $\theta$=45 degrees, P=100, Q=120, and M=30.

In FIG. 5, as a general expression of a hyperbola employing z axis and $\rho$ axis as mentioned above, the equation of a hyperbola which forms a predetermined cross section of the hyperbolic mirror 32 is represented by:

$$(z+a)^2/a^2 - \rho^2/b^2 = 1 \tag{3-0}$$

where N(z, $\rho$) is a given point on the parabola. On the other hand, the focus-to-focus distance L of hyperbola is represented by:

$$L = 2(a^2+b^2)^{1/2} \tag{3-2}$$

according to a general expression. Here, a and b are constants providing gradients of asymptotic lines of this hyperbola. Thus, the form of hyperbola will uniquely be determined if a and b are set.

Letting a reflection point R(Z, H) be the intersection between the optical axis of a luminous flux incident on the hyperbolic mirror 32 and the hyperbolic mirror 32, the above-mentioned constants a and b can be defined by coordinates of the reflection point R and the focus-to-focus distance L of hyperbolic mirror 32 as will be explained in the following.

As shown in FIG. 5, the focus-to-focus distance L of hyperbolic mirror 32 is represented by the following conditional expression (3-3):

$$L = \{[(Q-M)\sin\theta]^2 + [(P-M)-(Q-M)\cos\theta]^2\}^{1/2} \tag{3-3}$$

according to the optical axis bending angle $\theta$, the focal length P of condenser lens 34, the composite focal length Q of condenser lens 34 and hyperbolic mirror 32, and the distance M from the condenser lens 34 to the hyperbolic mirror 32.

In Example 3, since $\theta$=45 degrees, P=100, Q=120, and M=30, the focus-to-focus distance L=63.9567 in the hyperbolic mirror 32 according to conditional expression (3-3).

The above-mentioned conditional expression (3-3) defines a condition for the form of hyperbolic mirror 32 under which the focal length P=100 of positive condenser lens 34 (i.e., from the principal plane S to the focal point $F_1$) yields a composite focal length Q=120 of the positive condenser lens 34 and hyperbolic mirror 32 (i.e., from the principal plane S to the focal point F) in the case where the optical axis bending angle $\theta$=45 degrees, and the distance M=30 from the condenser lens 34 to the hyperbolic mirror 32. It is required for the hyperbolic mirror 32 to form a hyperbola passing the reflection point R with its origin O located at a given point on the z axis from the focal point $F_1'$ to the focal point F in a predetermined cross section.

Here, the origin O may be any point on the z axis from the focal point $F_1'$ to the focal point F. In Example 3, as shown in FIG. 5, the midpoint between the focal point $F_1'$ and the focal point F is taken as the origin O Here, the coordinates (Z, H) of reflection point are such that Z=25.0169, and H=69.6530 since the reflection point R is located on the hyperbola.

Constant a can be determined if the value of focus-to-focus distance L in the hyperbolic mirror 32 determined by conditional expression (3-3) and the coordinates (Z, H) of reflection point R are inputted into the following conditional expression (3-1). Conditional expression (3-1) is a cubic equation concerning constant a, which is obtained when constant b is eliminated from the above-mentioned expressions (3-0) and (3-2).

$$8za^3 + 4(Z^2+\rho^2)a^2 - 2zL^2 a - z^2 L^2 = 0 \tag{3-1}$$

Though three values are obtained as the solution of a, a positive value is employed as constant a. This will render a diverging action to the hyperbolic surface.

As a consequence, constant a=15.04 is obtained in the hyperbola in a predetermined cross section of the hyperbolic mirror 32 in Example 3. Here, constant b becomes 28.22. The form of hyperbolic mirror 32 is determined by constants a and b.

With constant $C=a/b^2$ and constant $K=-b^2/a^2$ which are defined by the above-mentioned constants a, b, the hyperbola can also be represented by the following conditional expression (3):

$$z = C\rho^2 / [1 + (1 - KC^2\rho^2)^{1/2}] \tag{3}$$

where N(z, $\rho$) is a given point on the hyperbola.

In Example 3, constants C and K become 0.0189 and −3.52, respectively. The form of hyperbolic mirror 32 may be defined by this conditional expression (3) as well.

EXAMPLE 4

Similarly, as a specific example of the hyperbolic mirror 32, Example 4 shows a case where the optical axis bending angle ($\theta$) caused by the hyperbolic mirror 32 is 90 degrees.

Figure 6:
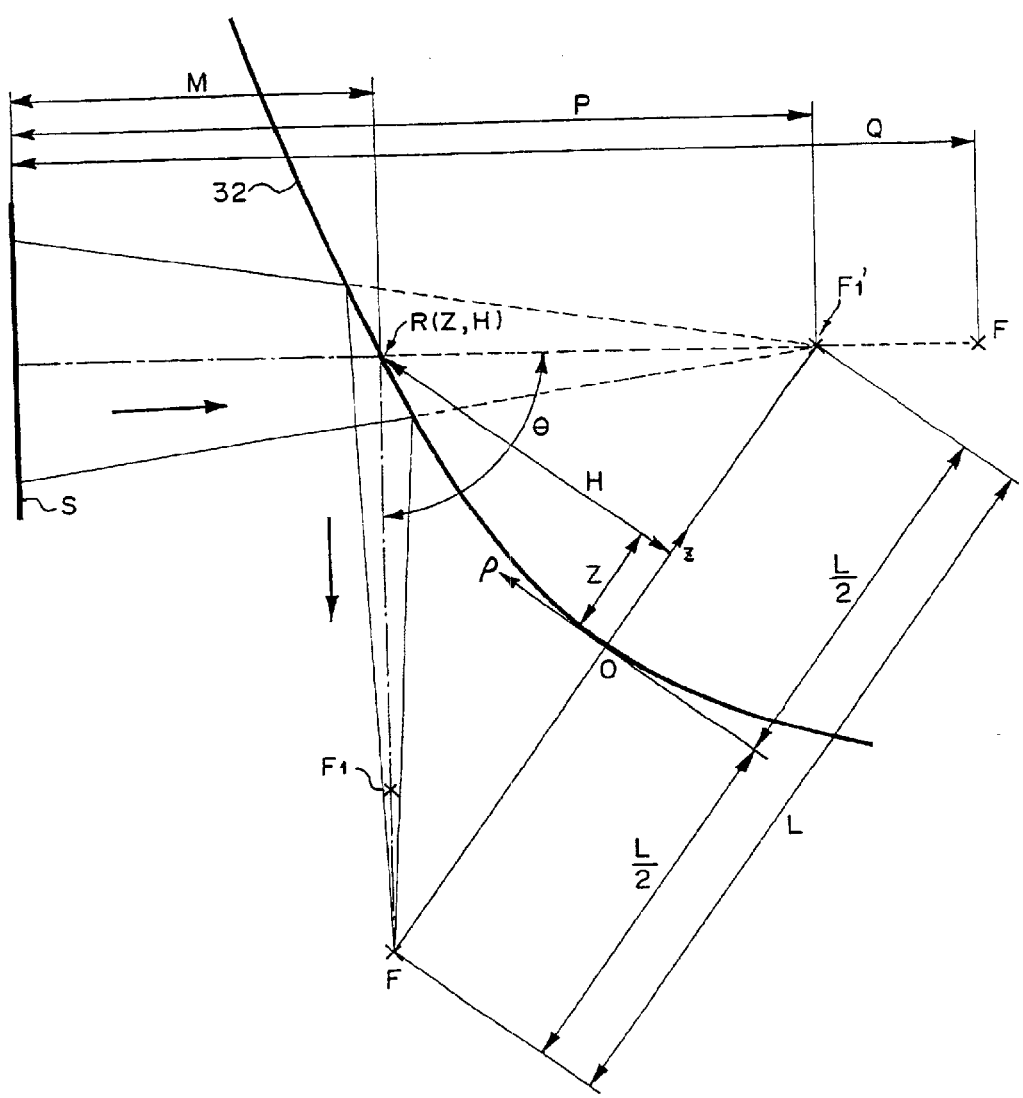
FIG. 6 is a view for explaining the form of hyperbolic mirror in Example 4.

FIG. 6 is a view schematically showing the form of hyperbolic mirror 32 in a cross section including the optical axis of a luminous flux bent by this hyperbolic mirror 32. In this cross section, the hyperbolic mirror 32 forms a part of a hyperbola.

The luminous flux emitted from the principle plane S of the upstream optical system is guided to the focal point F under the action of hyperbolic mirror 32 in FIG. 6 as well. As explained in the above-mentioned second embodiment, the condenser lens 34 having a positive refracting power is disposed upstream the hyperbolic mirror 32, and the convergent luminous flux emitted from the positive condenser lens 34 is reflected by the hyperbolic mirror 32, so as to be directed to the focal point F while lowering its degree of convergence. As in Example 3, the focal points $F_1$, $F_1'$, and F' are depicted in FIG. 6. The focal point F is a position which will be the center of a light valve if no field lens exists immediately upstream the light valve.

Concerning the hyperbolic mirror 32, the origin O, ρ axis, and z axis are taken as in Example 3. Here, the focal points F and $F_1'$ are located on the z axis.

The form of hyperbolic mirror 32 can be defined by the optical axis bending angle θ caused by the reflection of hyperbolic mirror 32, and the focus-to-focus distance L of hyperbolic mirror 32 calculated from the focal length P of condenser lens 34, composite focal length Q of condenser lens 34 and hyperbolic mirror 32, and distance M from the condenser lens 34 to the hyperbolic mirror 32. Example 4 shows a method of determining the form of hyperbolic mirror 32 in the case where θ=90 degrees, P=100, Q=120, and M=45.

As in Example 3, a condition is defined for the form of hyperbolic mirror 32 under which the focal length P=100 of positive condenser lens 34 (i.e., from the principal plane S to the focal point $F_1$) yields a composite focal length Q=120 of the positive condenser lens 34 and hyperbolic mirror 32 (i.e., from the principal plane S to the focal point F) in the case where the optical axis bending angle θ=90 degrees, and the distance M=45 from the condenser lens 34 to the hyperbolic mirror 32. It is required for the hyperbolic mirror 32 to form a hyperbola passing the reflection point R with its origin O located at a given point on the z axis from the focal point $F_1'$ to the focal point F in a predetermined cross section. From conditional expression (3-3), the distance from the focal point $F_1$ to the focal point F, i.e., the focus-to-focus distance L of hyperbola, is determined as L=93.0054.

Here, the origin O may be any point on the z axis from the focal point $F_1'$ to the focal point F. In Example 4, as shown in FIG. 6, the midpoint between the focal point $F_1'$ and the focal point F is taken as the origin O. Here, the coordinates (Z, H) of reflection point are such that Z=13.9777, and H=44.3523 since the reflection point R is located on the hyperbola.

According to conditional expression (3-1), as in Example 3, positive constant a for rendering a diverging action to the hyperbolic surface becomes a=26.37, and then constant b becomes 38.30. The form of hyperbolic mirror 32 is defined by constants a and b.

If the hyperbola of Example 4 is represented by conditional expression (3) with constant $C=a/b^2$ and constant $K=-b^2/a^2$ which are defined by the above-mentioned constants a, b, then constant C=0.0180, and constant K=−2.11. The form of hyperbolic mirror 32 may be defined by this conditional expression (3) as well.

As explained in the foregoing, since at least one curved mirror is disposed in an optical path in the illumination optical system in accordance with the present invention and the projection type image display apparatus using the same, this curved mirror can perform both of the action of a reflecting mirror for bending the optical path and the light-collecting or diverging action in place of lenses on the optical path. Therefore, an illumination optical system which can reduce the number of members so as to cut down the cost, and a projection type image display apparatus using the same can be obtained.

What is claimed is:

1. An illumination optical system for guiding light from a light source unit having a light-emitting element and a reflector, and an integrator unit which is downstream from the reflector and an image display light valve element downstream from the integrator, wherein at least one curved mirror is disposed between said integrator unit and said image display light valve element;

wherein said curved mirror is a parabolic mirror; and wherein said parabolic mirror has a form, in a cross section including an optical path of the light from said light source unit to said image display light valve element, satisfying the following conditional expression (1) or (2):

$$f=\{-L\pm L[1+(\tan\theta)^2]^{1/2}\}/2\tan\theta \qquad (1)$$

$$f=L/2 \qquad (2)$$

where

θ≠90+180n (n being an integer) degrees in conditional expression (1);

θ=90+180n (n being an integer) degrees in conditional expression (2);

f is the focal length of the parabolic mirror (where f>0);

L is the distance between the optical axis off luminous flux before reflection and z axis of the parabolic mirror; and θ is the optical axis bending angle caused by reflection of the parabolic mirror.

2. An illumination optical system according to claim 1, wherein said curved mirror is a hyperbolic mirror.

3. A projection type image display apparatus comprising the illumination optical system according to claim 1.

4. An illumination optical system according to claim 1, wherein a plurality of dichroic mirrors for separating a luminous flux from said integrator unit into three color components is disposed between said integrator unit and said image display light valve element, and guide said separated three color components to said image display light valve element respectively, and further wherein said at least one curved mirror is disposed between said integrator unit and said dichroic mirrors.

5. An illumination optical system for guiding light from a light source unit having a light-emitting element and a reflector, and an integrator unit which is downstream from the reflector and an image display light valve element downstream from the integrator, wherein at least one curved mirror is disposed between said integrator unit and said image display light valve element;

wherein said curved mirror is a hyperbolic mirror;

wherein said hyperbolic mirror has a form, in a cross section including an optical path of the light from said light source unit to said image display light valve element, satisfying the following conditional expression (3):

$$z=C\rho^2/[1+(1-KC^2\rho^2)^{1/2}] \qquad (3)$$

where z is the distance between the reflection point of the optical axis of luminous flux before reflection in the hyperbolic mirror and the tangent plane at the apex of the hyperbolic mirror;

ρ is the distance between the reflection point of the optical axis of luminous flux before reflection and z axis of the hyperbolic mirror;

C is a value defined as $C=a/b^2$ by a (where a>0) and b satisfying the following conditional expressions (3-1) and (3-2); and K is a value defined as $K=-a/b^2$ by a (where a>0) and b satisfying the following conditional expressions (3-1) and (3-2);

$$8za^3+4(z^2+\rho^2)a^2-2zL^2a-z^2L^2=0 \quad (3\text{-}1)$$

$$2(a^2+b^2)^{1/2}=L \quad (3\text{-}2)$$

where

L is the focus-to-focus distance of the hyperbolic mirror defined by the following conditional expression (3-3):

$$L=\{[(Q-M)\sin\theta]^2+[(P-M)-(Q-M)\cos\theta]^2\}^{1/2} \quad (3\text{-}3)$$

where

P is the focal length of the optical system upstream the hyperbolic mirror;

Q is the composite focal length of the optical system upstream the hyperbolic mirror and the hyperbolic mirror;

M is the distance from the optical system upstream the hyperbolic mirror to the hyperbolic mirror; and θ is the optical axis bending angle caused by reflection of the hyperbolic mirror.

6. An illumination optical system according to claim 5, wherein a plurality of dichroic mirrors for separating a luminous flux from said integrator unit into three color components is disposed between said integrator unit and said image display light valve element, and guide said separated three color components to said image display light valve element respectively, and further wherein said at least one curved mirror is disposed between said integrator unit and said dichroic mirrors.

7. A projection type image display apparatus comprising the illumination optical system according to claim 5.

8. An illumination optical system for guiding light from a light source unit to an image display light valve element, wherein at least one curved mirror is disposed in an optical path of said illumination optical system, wherein said curved mirror is a parabolic mirror, and wherein said parabolic mirror has a form, in a cross section including an optical path of the light from said light source unit to said image display light valve element, satisfying the following conditional expression (1) or (2):

$$f=\{-L\pm L[1+(\tan\theta)^2]^{1/2}\}/2\tan\theta \quad (1)$$

$$f=L/2 \quad (2)$$

where

θ≠90+180n (n being an integer) degrees in conditional expression (1);

θ=90+180n (n being an integer) degrees in conditional expression (2);

f is the focal length of the parabolic mirror (where f>0);

L is the distance between the optical axis of luminous flux before reflection and z axis of the parabolic mirror; and θ is the optical axis bending angle caused by reflection of the parabolic mirror.

9. An illumination optical system according to claim 8, wherein a plurality of dichroic mirrors for separating a luminous flux from said integrator unit into three color components is disposed between said integrator unit and said image display light valve element, and guide said separated three color components to said image display light valve element respectively, and further wherein said at least one curved mirror is disposed between said integrator unit and said dichroic mirrors.

10. A projection type image display apparatus comprising the illumination optical system according to claim 8.

11. An illumination optical system for guiding light from a light source unit to an image display light valve element, wherein at least one curved mirror is disposed in an optical path of said illumination optical system, wherein said curved mirror is a hyperbolic mirror, and wherein said hyperbolic mirror has a form, in a cross section including an optical path of the light from said light source unit to said image display light valve element, satisfying the following conditional expression (3):

$$z=C\rho^2/[1+(1-KC^2\rho^2)^{1/2}] \quad (3)$$

where z is the distance between the reflection point of the optical axis of luminous flux before reflection in the hyperbolic mirror and the tangent plane at the apex of the hyperbolic mirror;

ρ is the distance between the reflection point of the optical axis of luminous flux before reflection and z axis of the hyperbolic mirror;

C is a value defined as $C=a/b^2$ by a (where a>0) and b satisfying the following conditional expressions (3-1) and (3-2); and K is a value defined as $K=-a/b^2$ by a (where a>0) and b satisfying the following conditional expressions (3-1) and (3-2);

$$8za^3+4(z^2+\rho^2)a^2-2zL^2a-z^2L^2=0 \quad (3\text{-}1)$$

$$2(a^2+b^2)^{1/2}=L \quad (3\text{-}2)$$

where

L is the focus-to-focus distance of the hyperbolic mirror defined by the following conditional expression (3-3):

$$L=\{[(Q-M)\sin\theta]^2+[(P-M)-(Q-M)\cos\theta]^2\}^{1/2} \quad (3\text{-}3)$$

where

P is the focal length of the optical system upstream the hyperbolic mirror;

Q is the composite focal length of the optical system upstream the hyperbolic mirror and the hyperbolic mirror;

M is the distance from the optical system upstream the hyperbolic mirror to the hyperbolic mirror; and θ is the optical axis bending angle caused by reflection of the hyperbolic mirror.

12. An illumination optical system according to claim 11, wherein a plurality of dichroic mirrors for separating a luminous flux from said integrator unit into three color components is disposed between said integrator unit and said image display light valve element, and guide said separated three color components to said image display light valve element respectively, and further wherein said at least one curved mirror is disposed between said integrator unit and said dichroic mirrors.

13. A projection type image display apparatus comprising the illumination optical system according to claim 11.

* * * * *

UNITED STATES PATENT AND TRADEMARK OFFICE
CERTIFICATE OF CORRECTION

PATENT NO. : 6,870,580 B2
DATED : March 22, 2005
INVENTOR(S) : Kazuya Yoneyama

It is certified that error appears in the above-identified patent and that said Letters Patent is hereby corrected as shown below:

Coulmn 12,
Line 5, delete "reflector and an image display light valve element" and substitute therefore -- reflector to an image display light valve element --
Line 16, delete "f=L2" and substitute therefore -- f=L/2 --
Line 24, delete "off" and substitute therefore -- of --

Signed and Sealed this

Thirty-first Day of May, 2005

JON W. DUDAS
*Director of the United States Patent and Trademark Office*